US006865970B1

(12) United States Patent
Baxter, Jr.

(10) Patent No.: US 6,865,970 B1
(45) Date of Patent: Mar. 15, 2005

(54) ENGINE OIL PAN AND TRANSFER CASE HOUSING ASSEMBLY

(75) Inventor: Ralph W. Baxter, Jr., Fort Wayne, IN (US)

(73) Assignee: Torque Traction Technologies, INC, Maumee, OH (US)

( * ) Notice: Subject to any disclaimer, the term of this patent is extended or adjusted under 35 U.S.C. 154(b) by 389 days.

(21) Appl. No.: 09/684,893

(22) Filed: Oct. 10, 2000

(51) Int. Cl.[7] .............................................. F16H 57/02
(52) U.S. Cl. ..................................................... 74/606 R
(58) Field of Search .......................... 74/606 A, 606 R; 184/106, 1.5, 6.12, 6.5; 180/69.1, 233, 248

(56) References Cited

U.S. PATENT DOCUMENTS

| | | | | |
|---|---|---|---|---|
| 1,874,585 A | * | 8/1932 | Newcomb ..................... 184/106 |
| 4,226,200 A | | 10/1980 | Morisawa et al. | |
| 4,367,661 A | * | 1/1983 | Moroto et al. ........... 74/665 GE |
| 4,699,249 A | * | 10/1987 | Fujiura et al. .............. 184/11.1 |
| 4,738,152 A | * | 4/1988 | Takimura et al. .............. 74/467 |
| 4,738,159 A | * | 4/1988 | Kato et al. ................. 74/606 R |
| 5,050,447 A | * | 9/1991 | Hayakawa et al. ........ 74/606 R |
| 5,146,748 A | * | 9/1992 | Okada ........................... 60/454 |
| 5,176,039 A | * | 1/1993 | Takeuchi et al. ............... 74/467 |
| 5,186,078 A | | 2/1993 | Kameda et al. | |
| 5,467,668 A | | 11/1995 | Kameda et al. | |
| 5,617,764 A | * | 4/1997 | Komura et al. ........... 74/606 R |
| 5,718,651 A | | 2/1998 | Merkle et al. | |
| 5,743,156 A | | 4/1998 | Watanabe et al. | |
| 5,941,136 A | * | 8/1999 | Kusukawa et al. ........ 74/606 R |
| 6,283,890 B1 | * | 9/2001 | Schleuder et al. ........... 475/343 |

FOREIGN PATENT DOCUMENTS

| | | | | |
|---|---|---|---|---|
| JP | 3-43626 | * | 2/1991 | ........... F02B/61/06 |
| JP | 6137408 | * | 5/1994 | ............... 74/606 R |

* cited by examiner

Primary Examiner—David A. Bucci
Assistant Examiner—Vicky A. Johnson
(74) Attorney, Agent, or Firm—Liniak, Berenato & White

(57) ABSTRACT

An improved engine oil pan and transfer case assembly is provided wherein an oil reservoir and a first transfer case housing portion are unitarily combined. The first transfer case housing portion is adapted to combine together with a second transfer case housing portion to form a complete transfer case housing.

6 Claims, 3 Drawing Sheets

ENGINE OIL PAN AND TRANSFER CASE HOUSING ASSEMBLY

BACKGROUND OF THE INVENTION

1. Filed of the Invention

The disclosed invention relates to an oil pan and transfer case housing assembly.

2. Description of the Related Art

A vehicle which is operated on rough terrain or off-road conditions may encounter situations in which one axle has poor traction due to, for instance, a muddy road, while the other axle has good traction. To solve this problem, a four wheel drive has been provided to such vehicles, such as trucks, sport utility vehicles, and other models suitable for rough terrain or off-road use. Thus, four-wheel drive vehicles are also advantageous on paved roads where traction on each of two axles may be uneven due to snow, ice or rain, as well as during off-road use. These considerations are all well known in the art.

In order to provide a vehicle with four wheel drive, a transfer case must be included somewhere in the drive train in order to transfer some of the drive torque from the engine to the front and rear axles. However, the inclusion of a transfer case in an engine compartment requires more space from what is already a tightly compacted environment. Generally speaking, the more power desired for transfer to the rear axle, the larger the gears must be. Consequently, a housing for the transfer case must be large enough to enclose all of the gears and their associated bearings, resulting in either a smaller clearance between the transfer case and any components adjacent to the transfer case, or in vehicles having an increasingly long longitudinal axis.

Inclusion of a transfer case in an engine compartment also presents an additional problem of increased vibration. While not necessarily in this order, a drive train typically includes a drive shaft, a transmission, and a differential assembly connected to one another in sequence. When components subject to vibration are connected sequentially by linkages, the number of degrees of freedom of movement of individual components is greatly increased. In other words, every bend, twist, compression, decompression, or vibration of one component is magnified by the vibration of every other component in the sequence. When a transfer case is included in the drive train, it additionally magnifies these effects, and could result in an unacceptably high level of vibration of the drive train and other components mounted in the engine compartment. Increased vibration is undesirable because it reduces driver and passenger comfort, increases road noise, and loosens parts and linkages.

Therefore, there is a need in the art for a transfer case housing and engine oil pan assembly that introduces an acceptable level of vibration to the drive train and provides increased available space for larger gears in the transfer case.

SUMMARY OF THE INVENTION

It is then an object of the invention is to overcome the drawbacks of the prior art. More particularly, an oil pan and transfer case housing assembly is disclosed.

The inventor has discovered that these needs may be met by an oil pan and transfer case housing assembly comprising an oil pan and a second transfer case housing portion. The oil pan includes a reservoir unitarily formed with a first transfer case housing portion adapted to be secured to the second transfer case housing portion. The combination of the first transfer case housing portion of the oil pan and the second transfer case housing portion forms a complete transfer case housing.

An oil pan and transfer case housing assembly according to a first embodiment of the invention comprises an engine oil pan and a second transfer case housing portion. The engine oil pan includes a reservoir unitarily formed with a first transfer case housing portion having an open-ended hollow semi-cylinder-shaped mating portion adapted to be secured, in a complementary fashion, to the second transfer case housing portion. The second transfer case housing portion includes an open-ended hollow semi-cylinder-shaped mating portion. The combination of the open-ended hollow semi-cylinder-shaped mating portion of the first transfer case housing portion and the open-ended hollow semi-cylinder-shaped mating portion of the second transfer case housing portion forms a complete transfer case housing.

An oil pan and transfer case housing assembly according to a second embodiment of the invention comprises an oil pan and a second transfer case housing. The oil pan includes a reservoir unitarily formed with a first transfer case housing portion having an open-ended hollow semi-cylinder-shaped mating portion adapted to be secured to the second transfer case housing portion. The second transfer case housing includes an open ended hollow cylinder-shaped mating portion. The open-ended hollow semi-cylinder-shaped mating portion of the first transfer case housing portion concentrically overlaps the open-ended hollow cylinder-shaped mating portion of the second transfer case housing portion to form a complete transfer case housing.

DETAILED DESCRIPTION

The inventor has found that if a portion of a transfer case housing and engine oil pan assembly is made unitary, two important advantages are achieved. First, the clearance required between the oil pan and the transfer case housing may be decreased. This allows one to employ larger gears in the transfer case in order to transmit greater power to the rear axle. Second, it provides increased rigidity to the drive train, thereby reducing overall vibration. This is important for increasing driver and passenger comfort, reducing operational noise, and is especially important in deterring other automotive components from being loosened from their mountings.

Figure 1:
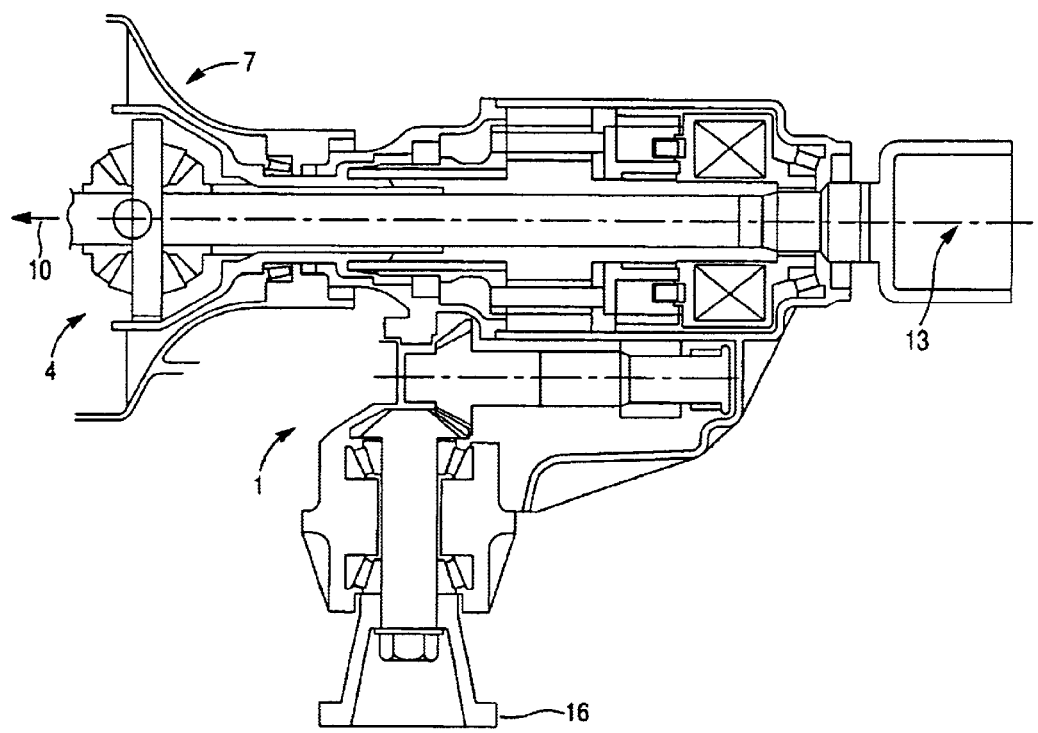
FIG. 1 is a plan view of a typical layout of a front differential and transfer case.

As shown in FIG. 1, a layout of a transfer case and front differential assembly for a four wheel drive vehicle includes a transfer case 1 and a front differential assembly 4. Drive torque from a transaxle 7 is transferred by the front differential 4 toward a left front half-shaft 10 and right front half-shaft 13 (through the transfer case 1). A portion of the drive torque from the front differential 4 is transferred by the transfer case 1 toward a rear drive shaft 16.

Figure 2:
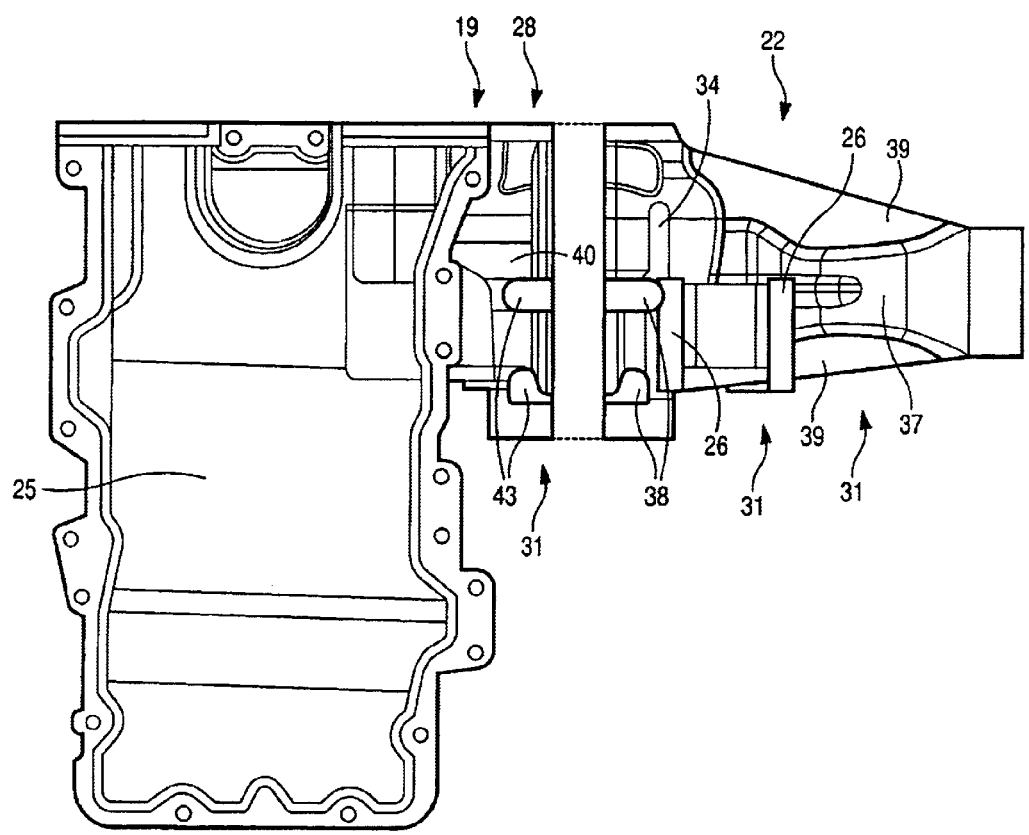
FIG. 2 is an exploded plan view of a first embodiment of the oil pan and transfer case assembly of the present invention.
Figure 3:
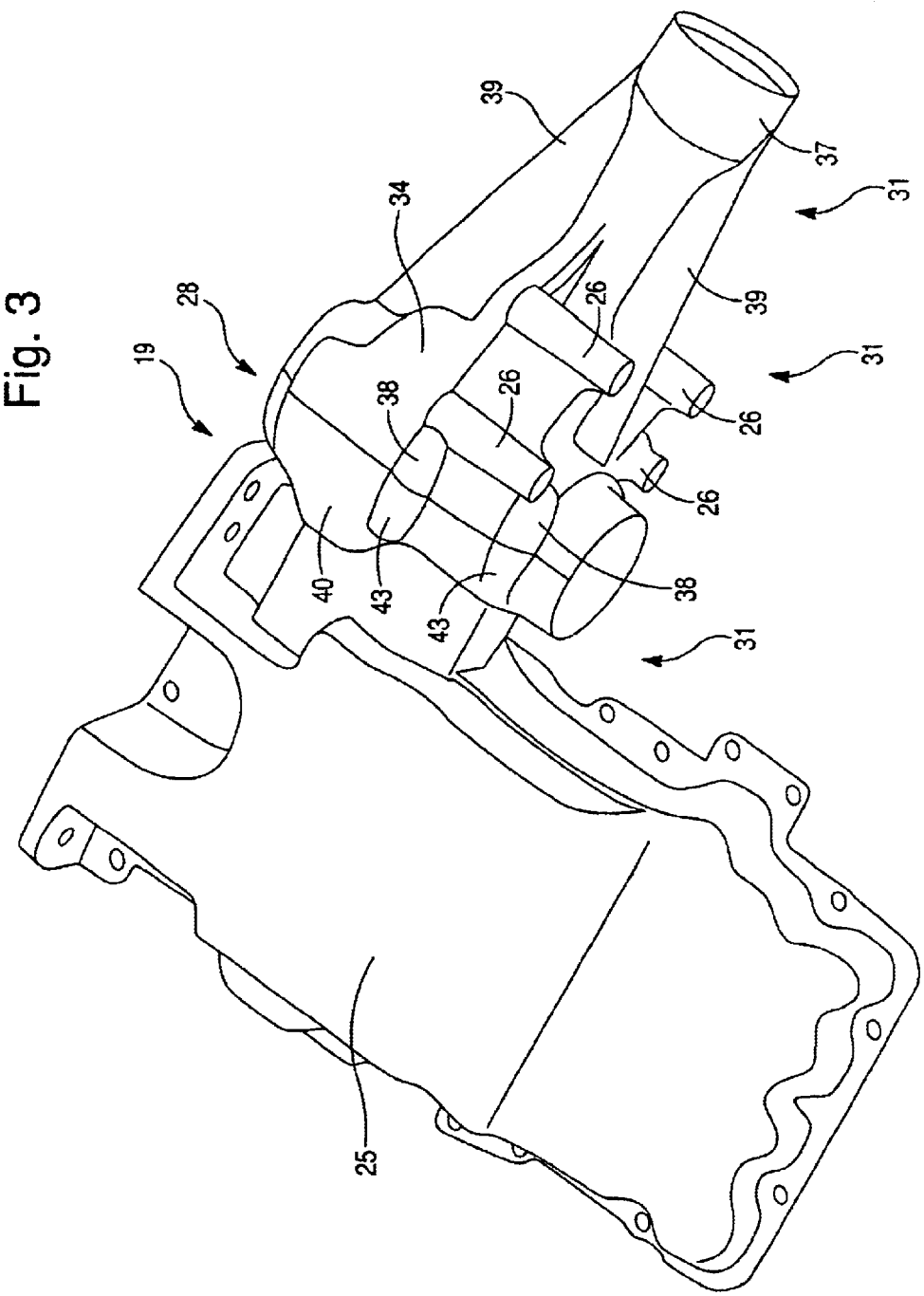
FIG. 3 is a perspective view of a first embodiment of the oil pan and transfer case assembly of the present invention.

As best illustrated in FIGS. 2 and 3, a first and preferred embodiment of the engine oil pan and transfer case housing assembly of the present invention includes an oil pan 19 and a second transfer case housing portion 22. As can be seen in FIG. 2, the oil pan 19 includes a reservoir 25 unitarily formed with a first transfer case housing portion 28 in a single casting. The first and second transfer case portions 28, 22 together combine to form a complete transfer case housing 31.

The second transfer case housing portion 22 includes an open-ended, hollow half-cylinder-shaped mating portion 34 that is connected to a plurality of mounting flanges 26 for mounting the transfer case housing 31 to the vehicle, an open-ended hollow cylinder-shaped transfer case housing sub-portion 37 oriented at a right angle to the open-ended hollow half-cylinder-shaped mating portion 34, and a generally planar tapered skirt 39 that extends to either side of the open-ended hollow cylinder-shaped housing sub-portion 37. The open-ended, hollow half-cylinder-shaped mating portion 34 of the second transfer case housing portion 22 is in open communication with one of the two open ends of the open-ended hollow cylinder-shaped housing sub-portion 37. The radius of the open-ended hollow half-cylinder-shaped mating portion of the second transfer case housing portion 22 varies along its axis, so that when the assembly of the present invention is combined, it may house gears of differing sizes and orientations disposed along its axis.

Approximately about midway along the axis of the open-ended, hollow half-cylinder-shaped mating portion 34 of the second transfer case housing portion 22 are two threaded bolt holes 38 for receiving connecting bolts, wherein each of these threaded bolt holes 38 is open only at one end.

The first transfer case housing portion 28 has an open-ended, hollow half-cylinder-shaped mating portion 40 that is a mirror image of the open-ended, hollow half-cylinder-shaped mating portion 34 of the second transfer case housing portion 22. The open-ended hollow half-cylinder-shaped mating portion 40 of the first transfer case housing portion 28 also includes two threaded bolt holes 43, wherein each of these threaded bolt holes 43 are open at each end. The threaded bolt holes 38, 43 of the open-ended hollow half-cylinder-shaped mating portions 40, 34 of the first and second transfer case housing portions 28, 22 are adapted to mate together, such that bolts may be passed through each of the threaded bolt holes 43 on the open-ended hollow half-cylinder-shaped mating portion 40 of the first transfer case housing portion 28 and into the open ends of the threaded bolt holes 38 on the open-ended hollow half-cylinder-shaped mating portion 34 of the second transfer case housing portion 22, in order to secure the first and second transfer case housing portions 28, 22 together. As may be seen, the first and second transfer case housing portions 28, 22 fit together to form a complete transfer case housing 31.

It is understood that a hollow half-cylinder-shape for each of the mating portions of the first and second transfer case housing portions is not essential to the invention. For example, the mating portions of each of the first and second transfer case housing portions may be semi-cylindrical, fully cylindrical, or have any other less than fully cylindrical shape, including but not limited to a quarter of a cylinder, a third of a cylinder, three quarters of a cylinder, etc., so long as the combination of the first and second transfer case housing portions combine to form a complete transfer case housing.

When the mating portion of the second transfer case housing portion has a full cylinder shape, the mating portion of the first transfer case housing portion may have a semi-cylinder shape, a half-cylinder shape or any other shape described as less than a half-cylinder, so long as the mating portion of the first transfer case housing portion engages the mating portion of the second transfer case housing portion in form-fitting fashion, thereby forming a complete transfer case housing to contain the gears of the transfer case therein.

In another example, when the mating portion of the second transfer case housing portion has a less than fully cylindrical shape, the mating portion of the first transfer case housing portion also has a less than fully cylindrical shape. The fractions of a cylinder described by each of the mating portions fit together in complementary fashion to form a complete housing. For example, the mating portion of the first transfer case portion may constitute roughly a quarter of the complete housing, while the mating portion of the second transfer case portion constitutes the remaining three quarters of the housing, or vice-versa. Thus, they fit together in complementary fashion to form a complete transfer case housing.

Some vehicles may have configurations wherein the transfer case is located in locations other than behind the engine oil pan. Although the preferred embodiment described above has an oil pan disposed forward of a transfer case housing, it is understood that other arrangements of the oil pan and transfer case housing, with respect to position, are possible, so long as a first transfer case housing portion is unitarily formed with a reservoir and is adapted to fit together with a second transfer case housing portion to form a complete transfer case housing. Such configurations include locations of oil pans and transfer cases wherein an oil pan is above the transfer case, an oil pan is to the left or right of the transfer case, and even wherein an oil pan is behind the transfer case.

Having thus described the invention, it will be realized that although the foregoing description of the inventor's preferred embodiment includes specific configurations and procedures, modifications and variations thereof might be employed without departing from the inventive concept herein.

What I claim is:

1. A combination engine oil pan and transfer case housing assembly, the combination comprising:

an engine oil pan having a reservoir unitarily formed with a first transfer case housing portion; and a second transfer case housing portion adapted to be secured to said first transfer case housing portion, wherein said first and second transfer case housing portions combine to form a complete transfer case housing.

2. The oil pan and transfer case housing assembly of claim 1, wherein said first transfer case housing portion includes an open-ended hollow semi-cylinder-shaped mating portion, said second transfer case housing portion includes an open-ended hollow cylinder-shaped mating portion, and said mating portion of said first transfer case housing portion mates with said mating portion of said second transfer case housing portion in form-fitting fashion.

3. The one-piece transfer case housing and engine oil pan assembly of claim 1, wherein said first transfer case housing portion includes an open-ended hollow semi-cylinder-shaped mating portion, said second transfer case housing includes an open-ended hollow semi-cylinder-shaped mating portion, and said mating portions of said first and second transfer case housing portions combine with each other in a complementary fashion such that their combination forms an open-ended hollow cylinder.

4. The engine oil pan and transfer case housing assembly of claim 3, wherein each of said open-ended hollow semi-cylinder-shaped mating portion of said second transfer case housing portion and said open-ended hollow semi-cylinder-shaped mating portion of said first transfer case housing portion has a variable radius.

5. The engine oil pan and transfer case assembly according to claim 1, wherein said first transfer case housing portion and second transfer case portion are bolted together to form a complete housing.

6. A combination engine oil pan and transfer case adapted to be secured to an automotive vehicle, said engine oil pan comprising:
- a resevoir portion unitarily formed with a first housing portion; and said transfer case including;
- a second housing portion, wherein said first housing portion of said engine oil pan and said second housing portion of said transfer case are bolted together to define a complete housing provided to retain a set of gears for differentially transferring torque between and input shaft and an output shaft.

* * * * *